US012589872B2

(12) United States Patent
Stoia et al.

(10) Patent No.: US 12,589,872 B2
(45) Date of Patent: Mar. 31, 2026

(54) METHOD AND SYSTEM FOR REDUCING A TEMPERATURE DIFFERENTIAL ACROSS A FLIGHT VEHICLE

(71) Applicant: The Boeing Company, Arlington, VA (US)

(72) Inventors: Michael F. Stoia, Rancho Santa Margarita, CA (US); Kevin Gerald Bowcutt, Aliso Viejo, CA (US); Arun Muley, San Pedro, CA (US); Jianping Tu, Walnut, CA (US); Emily Jacobs Dahlberg, St. Louis, MO (US); Ali Yousefiani, Tustin, CA (US)

(73) Assignee: The Boeing Company, Arlington, VA (US)

( * ) Notice: Subject to any disclaimer, the term of this patent is extended or adjusted under 35 U.S.C. 154(b) by 173 days.

(21) Appl. No.: 18/477,982

(22) Filed: Sep. 29, 2023

(65) Prior Publication Data

US 2025/0108915 A1      Apr. 3, 2025

(51) Int. Cl.
    B64C 30/00      (2006.01)
    B64C 1/38      (2006.01)
(52) U.S. Cl.
    CPC ............... B64C 30/00 (2013.01); B64C 1/38 (2013.01)
(58) Field of Classification Search
    CPC .... B64C 1/38; B64C 3/36; B64G 1/50; B64G 1/58; F42B 15/34
    See application file for complete search history.

(56) References Cited

U.S. PATENT DOCUMENTS

| | | | | |
|---|---|---|---|---|
| 3,194,300 A | * | 7/1965 | Friedman | B64G 1/50 165/905 |
| 4,676,300 A | * | 6/1987 | Miyazaki | B64G 1/50 165/277 |
| 4,923,146 A | * | 5/1990 | Anthony | B64C 1/38 244/119 |

(Continued)

FOREIGN PATENT DOCUMENTS

| | | | | |
|---|---|---|---|---|
| CN | 109612132 A | * | 4/2019 | F01K 27/00 |
| EP | 3357815 A1 | * | 8/2018 | F28D 15/0241 |

OTHER PUBLICATIONS

European Patent Office, Extended European Search Report in related application EP 24 19 6719, Jan. 28, 2025.

*Primary Examiner* — Joseph W Sanderson
(74) *Attorney, Agent, or Firm* — Kolitch Romano Dascenzo Gates LLP

(57)      ABSTRACT

Method and system for reducing a temperature differential across a flight vehicle. The system includes an exterior of the flight vehicle. The exterior of the flight vehicle includes a first exterior panel being at a first initial temperature and a second exterior panel being at a second initial temperature to define an initial temperature differential. A fluid loop, containing a working fluid, is coupled to the first exterior panel and the second exterior panel such that heat is transferred from the first exterior panel to the working fluid to decrease the first initial temperature of the first exterior panel to a first altered temperature, and to heat the working fluid. The heated working fluid is circulated from the first exterior panel and used to heat the second exterior panel to a second altered temperature greater than the second initial temperature.

20 Claims, 7 Drawing Sheets

(56)           References Cited

U.S. PATENT DOCUMENTS

|   |   |   |   |   |
|---|---|---|---|---|
| 5,149,018 | A * | 9/1992 | Clark | B64C 1/38 |
|  |  |  |  | 244/57 |
| 6,883,588 | B1 * | 4/2005 | Low | B64G 1/503 |
|  |  |  |  | 62/235.1 |
| 8,616,271 | B2 * | 12/2013 | Hugon | B64G 1/50 |
|  |  |  |  | 165/41 |
| 9,776,739 | B2 * | 10/2017 | Dmitriev | F04C 18/107 |
| 9,939,203 | B2 * | 4/2018 | Cho | F28D 15/02 |
| 10,053,239 | B2 * | 8/2018 | Mabe | B64G 1/10 |
| 10,174,973 | B2 * | 1/2019 | Dmitriev | F04C 18/107 |
| 11,465,766 | B2 * | 10/2022 | Stoia | B64C 30/00 |
| 11,571,742 | B2 * | 2/2023 | Yousefiani | B22F 7/008 |
| 11,598,285 | B2 * | 3/2023 | Stoia | F02G 5/00 |
| 11,639,014 | B2 * | 5/2023 | Powell | B64G 1/50 |
|  |  |  |  | 156/242 |
| 11,753,178 | B2 * | 9/2023 | Kool | F02C 7/224 |
|  |  |  |  | 62/7 |
| 12,356,590 | B2 * | 7/2025 | Moriyama | B64G 1/503 |
| 2008/0217483 | A1 * | 9/2008 | Hugon | B64G 1/503 |
|  |  |  |  | 244/172.6 |
| 2015/0315971 | A1 * | 11/2015 | Reitz | B64C 1/38 |
|  |  |  |  | 60/39.461 |
| 2016/0363381 | A1 * | 12/2016 | Cho | F28D 15/0266 |
| 2017/0059211 | A1 * | 3/2017 | Dmitriev | B64G 1/50 |
| 2017/0066519 | A1 * | 3/2017 | Mabe | B64G 1/22 |
| 2017/0356678 | A1 * | 12/2017 | Dmitriev | F04C 18/107 |
| 2020/0180245 | A1 * | 6/2020 | Powell | B64G 1/50 |
| 2020/0407072 | A1 * | 12/2020 | Stoia | B64C 30/00 |
| 2021/0139160 | A1 * | 5/2021 | Kool | F02C 7/224 |
| 2021/0202964 | A1 * | 7/2021 | Junaedi | C25B 15/02 |
| 2021/0205883 | A1 * | 7/2021 | Yousefiani | B32B 9/041 |
| 2021/0205884 | A1 * | 7/2021 | Yousefiani | C22C 1/05 |
| 2022/0260036 | A1 * | 8/2022 | Stoia | F01K 7/32 |
| 2022/0260037 | A1 * | 8/2022 | Stoia | F02C 7/141 |
| 2022/0340252 | A1 * | 10/2022 | MacDonald | B64C 3/28 |
| 2022/0364795 | A1 * | 11/2022 | Moriyama | B64G 1/50 |
| 2023/0232588 | A1 * | 7/2023 | Moriyama | B64G 1/503 |
|  |  |  |  | 62/3.2 |
| 2023/0278695 | A1 * | 9/2023 | Rathay | B64C 30/00 |
|  |  |  |  | 244/117 A |
| 2024/0095423 | A1 * | 3/2024 | Elford | G06F 30/10 |
| 2024/0256718 | A1 * | 8/2024 | Elford | G06F 30/23 |
| 2025/0108915 | A1 * | 4/2025 | Stoia | B64C 30/00 |

* cited by examiner

METHOD AND SYSTEM FOR REDUCING A TEMPERATURE DIFFERENTIAL ACROSS A FLIGHT VEHICLE

BACKGROUND

A flight vehicle traveling through the atmosphere at a flight speed of at least Mach 3 may experience aerodynamic heating of an exterior surface of the flight vehicle. The aerodynamic heating may cause the exterior surface of the flight vehicle to reach high temperatures, so these types of flight vehicles may be designed using materials suitable for high temperatures due to the flight speed of at least Mach 3. However, at the flight speed of at least Mach 3, different temperatures are reached at different locations of the exterior surface of the flight vehicle, which may cause thermal distortion of an airframe of the flight vehicle and/or increase fuel heat sink demand to thermally balance the flight vehicle.

SUMMARY

Therefore, it is desirable to develop a method and a system to reduce temperature differentials between different locations of an exterior of a flight vehicle.

The present disclosure provides a system for reducing a temperature differential across a flight vehicle traveling at a flight speed of at least Mach 3. The system includes an exterior of the flight vehicle. The exterior of the flight vehicle includes a first exterior panel being at a first initial temperature and a second exterior panel being at a second initial temperature. The first initial temperature is greater than the second initial temperature. A temperature difference between the first initial temperature and the second initial temperature defines an initial temperature differential. The system also includes a fluid loop configured to contain a working fluid. The fluid loop is coupled to the first exterior panel and the second exterior panel such that heat is transferred from the first exterior panel to the working fluid to decrease the first initial temperature of the first exterior panel to a first altered temperature, and to heat the working fluid. The heated working fluid is circulated from the first exterior panel and used to heat the second exterior panel to a second altered temperature greater than the second initial temperature. A temperature difference between the first altered temperature and the second altered temperature defines a secondary temperature differential less than the initial temperature differential.

The present disclosure also provides a method for reducing a temperature differential across an exterior of a flight vehicle. The flight vehicle is advanced at a flight speed of at least Mach 3. The exterior of the flight vehicle is aerodynamically heated via advancing the flight vehicle at the flight speed. The exterior includes a first exterior panel being at a first initial temperature and a second exterior panel being at a second initial temperature. The first initial temperature is greater than the second initial temperature, and a temperature difference between the first initial temperature and the second initial temperature defines an initial temperature differential. A working fluid is circulated through a fluid loop. The fluid loop is coupled to the first exterior panel and the second exterior panel. Heat is transferred from the first exterior panel to the working fluid which decreases the first initial temperature of the first exterior panel to a first altered temperature and heats the working fluid. The heated working fluid is circulated from the first exterior panel and using the heated working fluid to heat the second exterior panel to a second altered temperature greater than the second initial temperature. A temperature difference between the first altered temperature and the second altered temperature defines a secondary temperature differential less than the initial temperature differential.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1:
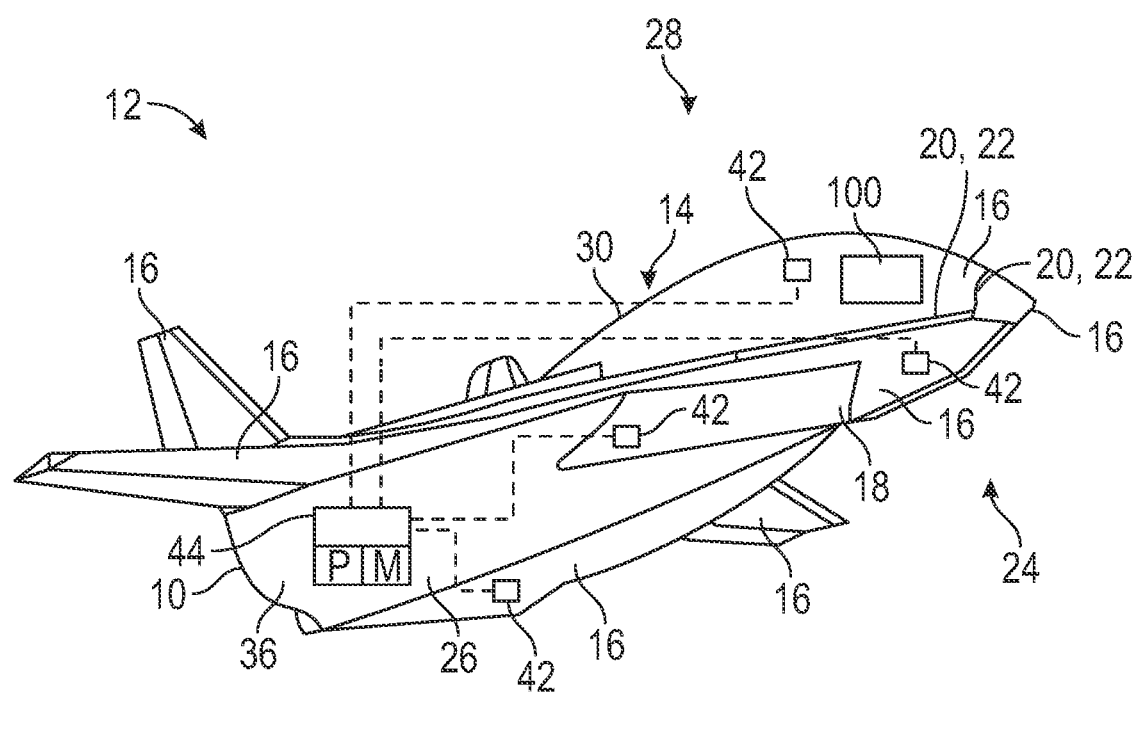
FIG. 1 is a schematic perspective view of a flight vehicle including an exterior having exterior panels and the flight vehicle incorporates a system and a method as described herein.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, a flight vehicle 10 is generally shown in FIG. 1. The flight vehicle 10 is incorporated with a system 12 and a method 100 as described herein. Generally, the system 12 and the method 100 as described herein may be used to reduce temperature differentials between different locations of an exterior 14 of the flight vehicle 10, which provides various benefits, improvements, advantages, etc., some of which are discussed below.

As shown in FIG. 1, the flight vehicle 10 includes the exterior 14 having a plurality of exterior panels 16. That is, the exterior 14, having the exterior panels 16, forms an exterior skin of the flight vehicle 10, which may include various types of panels, including but not limited to acreage panels, leading edge panels, duct panels (inlet duct 18 is shown in FIG. 1), skin panels, engine combustor liners, exhaust nozzles, etc. The exterior panels 16 are integrated with each other to form an outer configuration of the flight vehicle 10. The exterior panels 16 may be disposed proximal to each other, i.e., next to each other, and a plurality of joints 20 are formed where adjacent ones of the exterior panels 16 join together. The joints 20 are joined together at mold lines 22 to form a generally continuous exterior skin. The mold lines 22 of the joints 20 may be subject to thermal distortion due to temperature differentials along the exterior panels 16. The system 12 and the method 100 described herein may reduce or minimize thermal distortion along the mold lines 22.

Generally, the exterior 14 of the flight vehicle 10 is aerodynamically heated when the flight vehicle 10 is advanced at a flight speed. As the flight vehicle 10 travels at the flight speed, different locations of the exterior 14 may heat up to different temperatures. For example, one of the exterior panels 16 may heat up to a temperature different from a temperature of another one of the exterior panels 16, and so on for each of the exterior panels 16 of the flight vehicle 10. As described herein, the system 12 and the method 100 may redistribute heat from one or more of the exterior panels 16 to heat one or more other ones of the exterior panels 16, to reduce temperature differentials between the exterior panels 16, which, by doing so the flight vehicle 10 achieves a more homogeneous skin temperature, which may assist in mitigating thermal distortion of the mold lines 22.

For the below discussion, the exterior 14 of the flight vehicle 10, and more specifically, the exterior panels 16, may include a first exterior panel 16A and a second exterior panel 16B. The first exterior panel 16A and the second exterior panel 16B may be at different temperatures during flight, and therefore, it may be desirable to decrease the temperature differential between these exterior panels 16A, 16B. For example, the first exterior panel 16A may include a windward skin panel 24 disposed along a bottom face 26 of the flight vehicle 10 and the second exterior panel 16B may include a leeward skin panel 28 disposed along a top face 30 of the flight vehicle 10. Due to the location of the windward skin panel 24 as compared to the leeward skin panel 28, the windward skin panel 24 reaches a temperature higher than the leeward skin panel 28, and therefore, it is desirable to reduce the temperature of the windward skin panel 24, and use the heat from the windward skin panel 24 to increase the temperature of the leeward skin panel 28, which reduces the temperature differential between the windward skin panel 24 and the leeward skin panel 28.

Therefore, disclosed herein is the system 12 for reducing a temperature differential across the flight vehicle 10 traveling at the flight speed of at least Mach 3. During operation of the flight vehicle 10 at or above Mach 3, including hypersonic flight (e.g., the flight vehicle 10 moves at hypersonic speeds at or above Mach 5), the exterior 14 of the flight vehicle 10 is aerodynamically heated. For example, the temperature of the exterior 14 of the flight vehicle 10 may exceed 1000 degrees Celsius (C). The below discussion will focus on the temperature differential between two locations, but it is to be appreciated that the system 12 and the method 100 may be applied to any number of locations across the exterior 14 of the flight vehicle 10. Therefore, for the below discussion, the exterior 14 of the flight vehicle 10 includes the first exterior panel 16A and the second exterior panel 16B.

Generally, for all of the configurations of FIGS. 3-6, the system 12 includes a fluid loop 32 configured to contain a working fluid 33. The fluid loop 32 is coupled to the exterior panels 16, and therefore, the flight vehicle 10 may include the fluid loop 32 integrated along the exterior panels 16. For illustrative purposes below, the fluid loop 32 is coupled to the first exterior panel 16A and the second exterior panel 16B, such that heat is transferred from one or more of the exterior panels 16 to the working fluid 33. The heated working fluid 33 is then transferred through the fluid loop 32 and used to heat one or more other ones of the exterior panels 16 in various ways as described below in FIGS. 3-6. Therefore, for example, heat transferred from the first exterior panel 16A reduces the temperature of the first exterior panel 16A, and the heated working fluid 33 is used to increase the temperature of the second exterior panel 16B, which thus, reduces the temperature differential between the first exterior panel 16A and the second exterior panel 16B.

Figure 7:
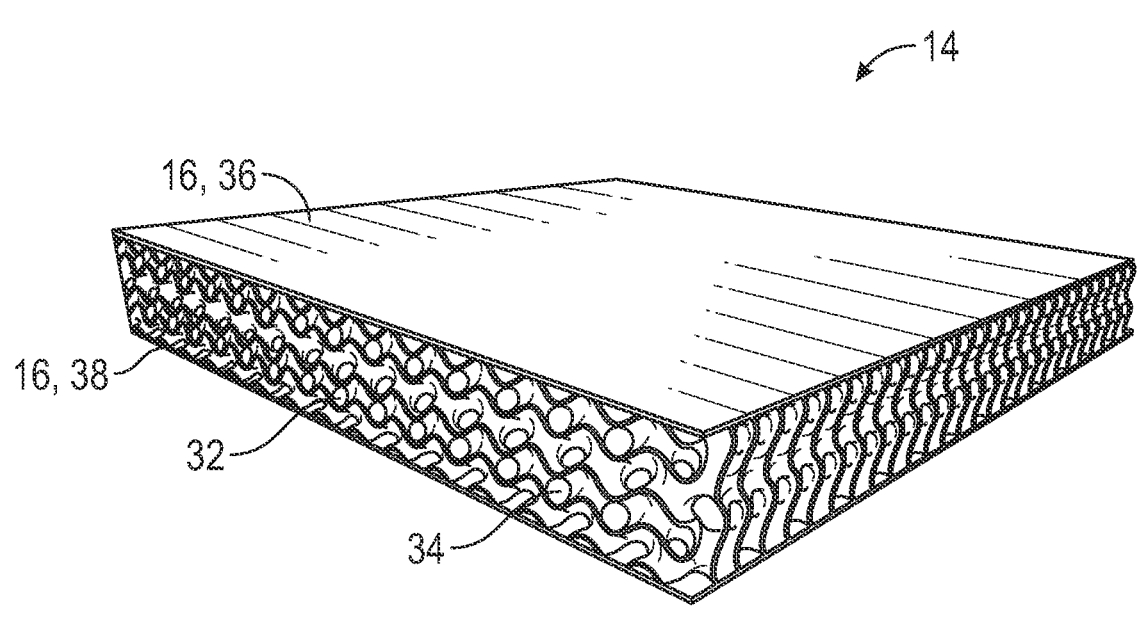
FIG. 7 is a schematic cross-sectional perspective view of an exterior panel of a first configuration.
Figure 8:
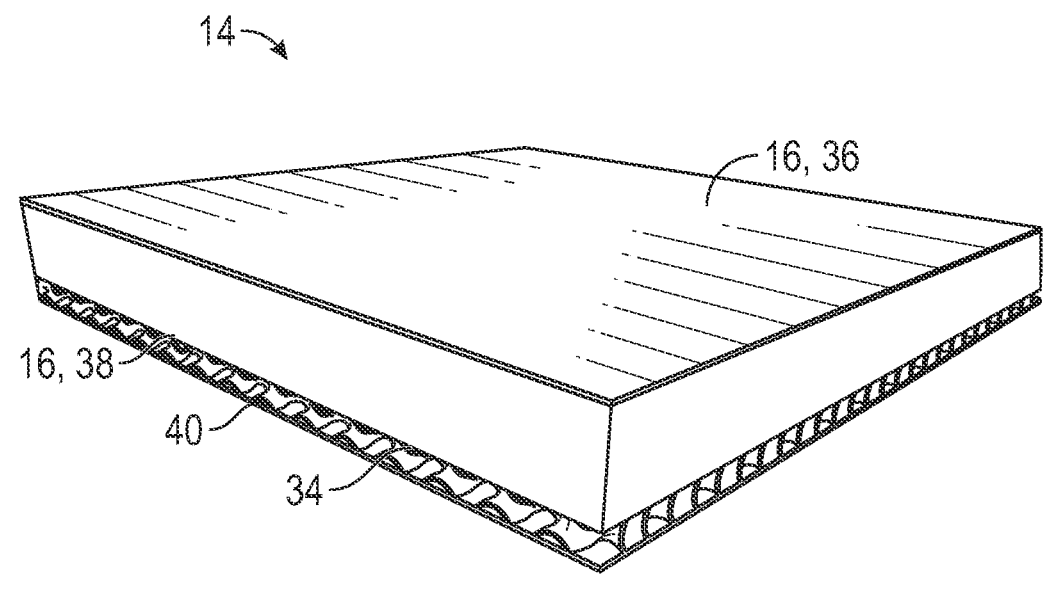
FIG. 8 is a schematic cross-sectional perspective view of an exterior panel of a second configuration.

The fluid loop 32 may be coupled to the exterior panels 16 in any suitable location. For example, the fluid loop 32 may be disposed internal to, or integral with, the exterior panels 16, and as another example, the fluid loop 32 may be disposed external of, or adjacent to, the exterior panels 16. For illustrative purposes, FIG. 7 illustrates the fluid loop 32 internal to one or more of the exterior panels 16, and FIG. 8 illustrates the fluid loop 32 external to one or more of the exterior panels 16. Regardless of the location of the fluid loop 32, the fluid loop 32 is disposed inside of the flight vehicle 10 such that the fluid loop 32 is not visible from outside of the flight vehicle 10 so that the fluid loop 32 does not affect aerodynamics of the flight vehicle 10.

For example, when the fluid loop 32 is internal to the exterior panels 16, such as the illustration of FIG. 7, the exterior panels 16 may include a plurality of apertures 34 that define the fluid loop 32. The apertures 34 are disposed between an outer surface 36 and an inner surface 38 of the exterior panels 16. The apertures 34 may be of any suitable configuration, and non-limiting examples may include gyroid, cubic, rhomboid, triangular, random, circular, rectangular, wavy, or any other suitable configuration. Therefore, in certain configurations, the apertures 34 create a porous structure through the exterior panels 16, and the porous structure of the fluid loop 32 may include a triply periodic minimal surface (gyroid), a lattice structure, etc.

Referring to FIG. 8, when the fluid loop 32 is external to the exterior panels 16, the fluid loop 32 is attached to the inner surface 38 of the exterior panel 16. As such, when the fluid loop 32 is exterior 14 to the exterior panels 16, the fluid loop 32 passes across the exterior panel 16 in a serpentine pattern, a winding pattern, etc., relative to the inner surface 38 of the exterior panels 16. The fluid loop 32 may include one or more tubes 40 attached to the inner surface 38 of the exterior panel 16. The tubes 40 may be any suitable configuration, and non-limiting examples may include circular, triangular, rectangular, or any other suitable configuration.

In certain configurations, the fluid loop 32 is integrated into the windward skin panel 24 and the leeward skin panel 28. One or more of the mold lines 22 may join the exterior panels 16 together, such as the windward skin panel 24 and the leeward skin panel 28. Generally, the fluid loop 32 is integrated into the windward skin panel 24 and the leeward skin panel 28 adjacent to the mold lines 22. By reducing the temperature differential between the windward skin panel 24 and the leeward skin panel 28, thermal distortion is reduced or minimized at the mold lines 22, which reduces structural loads along an airframe of the flight vehicle 10. By reducing structural loads along the airframe of the flight vehicle 10, aerodynamics of the exterior 14 of the flight vehicle 10 may be improved, and fuel leakages may be minimized.

Figure 2:
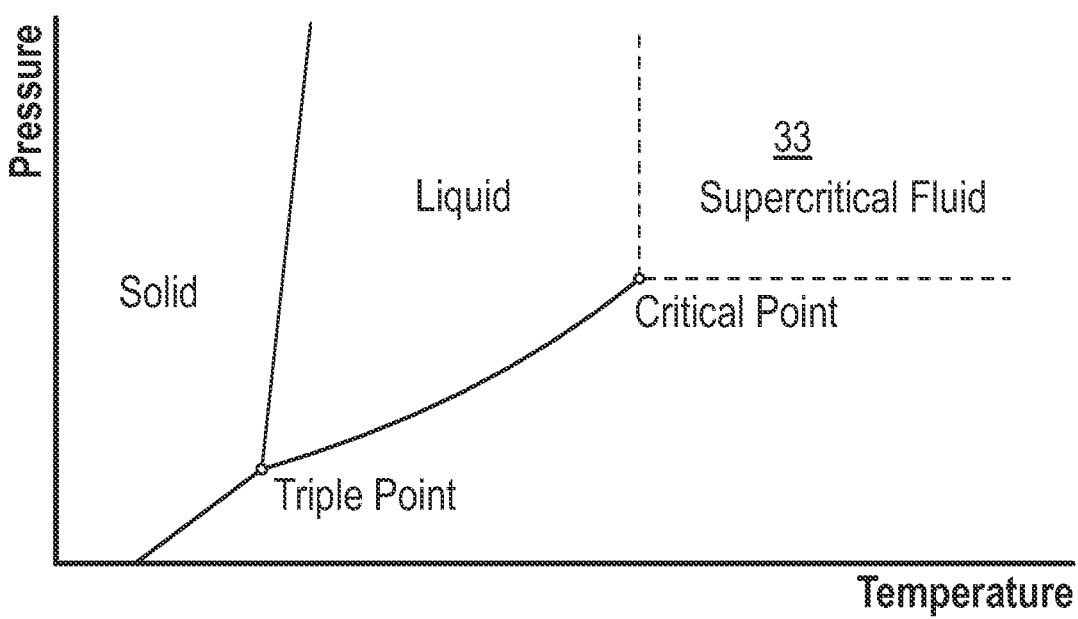
FIG. 2 is a graph of an example supercritical working fluid.

Depending on the type of the working fluid 33 being used, the working fluid 33 may be in a supercritical state. For example, the working fluid 33 may be used in the fluid loop 32 due to a magnitude of heat generated via the flight vehicle 10 at the high speed, and the magnitude of heat absorbed by the working fluid 33 maintains the working fluid 33 in the supercritical state. The working fluid 33 attains the supercritical state when a temperature and a pressure of the working fluid 33 is above a critical point (see FIG. 2). Therefore, heat from the exterior 14 of the flight vehicle 10 is transferred to the working fluid 33 in the fluid loop 32, which maintains the working fluid 33 at the temperature and the pressure above the critical point. FIG. 2 graphically illustrates the critical point of the working fluid 33, where temperatures and pressures above the critical point will result in the supercritical state. The working fluid 33 may be any suitable substance, some of which achieve the supercritical state and some of which do not achieve the supercritical state. Non-limiting examples of the working fluid 33 may include supercritical carbon dioxide, supercritical helium (sHe), molten salt(s), sodium-potassium alloy (NaK), cesium, lithium, etc. Therefore, example working fluids 33 that achieve the supercritical state may include carbon dioxide, helium, etc., and example working fluids 33 that do not achieve the supercritical state may include molten salt(s), sodium-potassium alloy (NaK), cesium, lithium, etc.

When the flight vehicle 10 is traveling at the flight speed of at least Mach 3, the first exterior panel 16A is at a first initial temperature and the second exterior panel 16B is at a second initial temperature. The first initial temperature is greater than the second initial temperature, and a temperature difference between the first initial temperature and the second initial temperature define an initial temperature differential. The fluid loop 32 is coupled to the first exterior panel 16A and the second exterior panel 16B such that heat is transferred from the first exterior panel 16A to the working fluid 33 to decrease the first initial temperature of the first exterior panel 16A to a first altered temperature, and to heat the working fluid 33. The heated working fluid 33 is circulated from the first exterior panel 16A and used to heat the second exterior panel 16B to a second altered temperature greater than the second initial temperature. A temperature difference between the first altered temperature and the second altered temperature defines a secondary temperature differential less than the initial temperature differential. The system 12 is activated to redistribute heat in light of the initial temperature differential to attain the secondary temperature differential, which causes the exterior panels 16 to be closer in temperature relative to each other as compared to not using the system 12 and the method 100 described herein. By reducing the temperature differential between the exterior panels 16, this will assist in mitigating thermal distortions along the mold lines 22, which assists in reducing adverse structural loads due to thermal distortion. Also, by reducing the temperature differential between the exterior panels 16, thermal stresses across various components of the flight vehicle 10 may be reduced and different types of materials having lower temperature characteristics may be used for various components of the flight vehicle 10.

Optionally, for any of the configurations herein, the system 12 may include a plurality of sensors 42 (see FIG. 1) disposed along the exterior 14 of the flight vehicle 10. More specifically, one or more of the sensors 42 may be disposed along the exterior panels 16. The sensors 42 may be integrated into the exterior panels 16 or disposed along the inner surface 38 of the exterior panels 16. The sensors 42 are configured to provide information about the temperature of the exterior 14, and more specifically, provide information about the temperature of various locations of the exterior panels 16. This temperature information may be used to monitor the temperature of the exterior 14 and/or determine where to redistribute heat across the flight vehicle 10. For example, the sensors 42 may be any suitable configuration, and non-limiting examples may include temperature sensors that measure the actual temperature of the exterior 14 and/or strain sensors that measures thermal distortion of the exterior 14 to determine the temperature of the exterior 14.

For example, the sensors 42 may include a first sensor 42A coupled to the first exterior panel 16A to measure the first initial temperature and the first altered temperature, and a second sensor 42B coupled to the second exterior panel 16B to measure the second initial temperature and the second altered temperature. Therefore, the first sensor 42A may be a temperature sensor or a strain sensor, or any other suitable sensor to provide information about the temperature of various locations of the exterior panels 16. Even though this example includes two sensors 42, it is to be appreciated any suitable number of sensors 42 may be used along any suitable number of the exterior panels 16.

Figure 9:
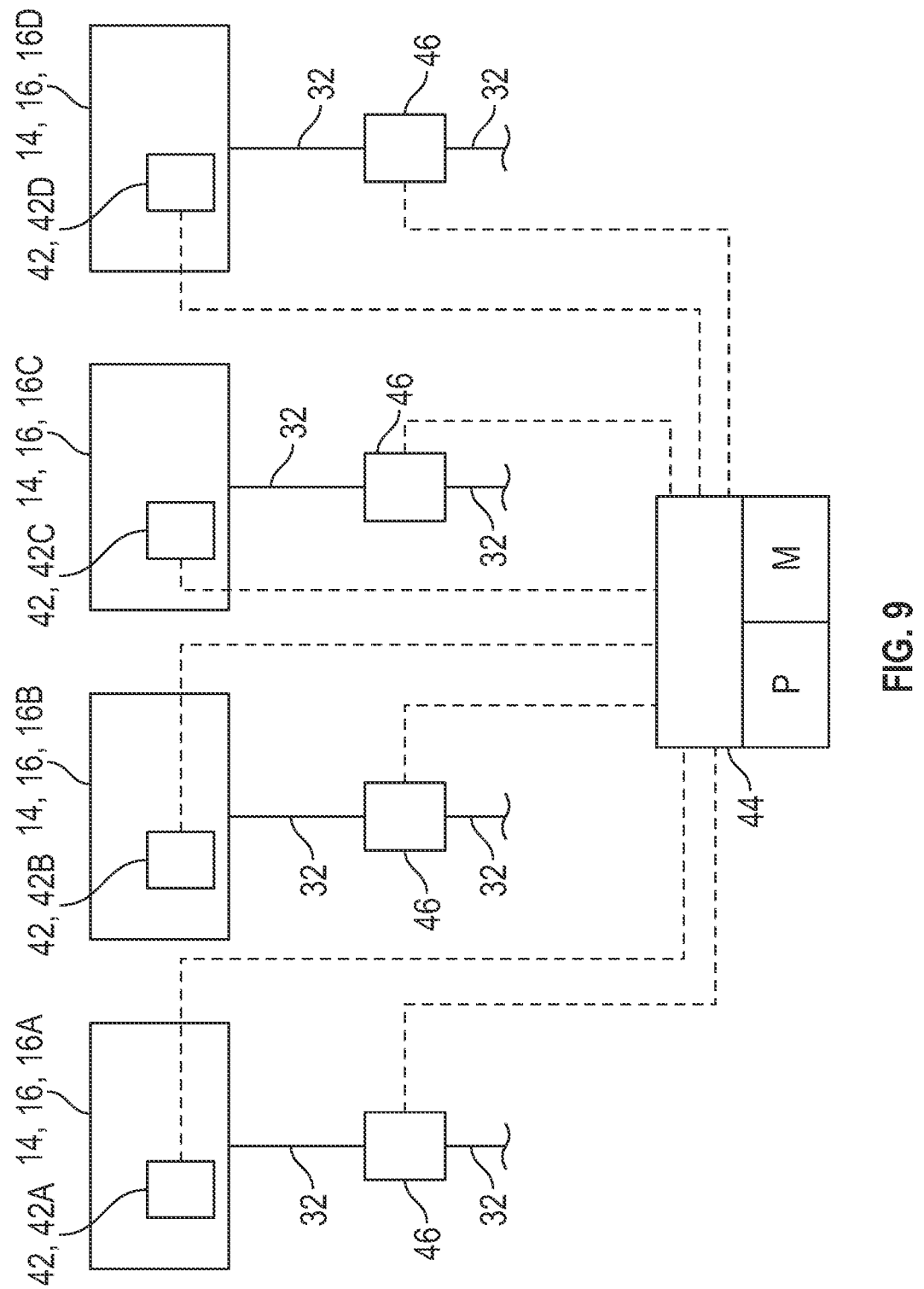
FIG. 9 is a schematic illustration of exterior panels, sensors, valves along a fluid loop, with a controller in communication with the sensors and the valves.

For illustrative purposes some additional exterior panels 16 and sensors 42 are briefly discussed. FIG. 9 schematically illustrates multiple exterior panels 16 and multiple sensors 42 for this discussion. Again, the discussion herein may apply to any suitable number of exterior panels 16 and sensors 42, and FIG. 9 is for illustrative purposes. Therefore, in certain configurations, the exterior 14 may include a third exterior panel 16C and a fourth exterior panel 16D, and the fluid loop 32 may be coupled to the third exterior panel 16C and the fourth exterior panel 16D. As such, the fluid loop 32 may be coupled to the first, second, third, and/or fourth exterior panels 16A, 16B, 16C, 16D. Optionally, the sensors 42 may further include a third sensor 42C and a fourth sensor 42D. As such, in certain configurations, the third sensor 42C may be coupled to the third exterior panel 16C and the fourth sensor 42D may be coupled to the fourth exterior panel 16D. The third sensor 42C may measure a third initial temperature and a third altered temperature of the third exterior panel 16C. The fourth sensor 42D may measure a fourth initial temperature and a fourth altered temperature of the fourth exterior panel 16D. Therefore, the third sensor 42C may be a temperature sensor or a strain sensor, or any other suitable sensor to provide information about the temperature of various locations of the exterior panels 16, and similarly, the fourth sensor 42D may be a temperature sensor or a strain sensor, or any other suitable sensor to provide information about the temperature of various locations of the exterior panels 16.

The system 12 may also include a controller 44 (FIG. 1) in communication with the sensors 42 to receive information about the temperature of the exterior 14. The controller 44 may use the information from the sensors 42 to monitor the temperature of the exterior 14, determine where to redistribute heat across the flight vehicle 10, and/or control other components of the system 12. It is to be appreciated that the controller 44 may be used to perform other functions, some of which are discussed herein.

Turning back to the sensors 42, for example, the controller 44 may be in communication with the first sensor 42A and the second sensor 42B to receive information about the first initial temperature and the first altered temperature of the first exterior panel 16A and the second initial temperature and the second altered temperature of the second exterior panel 16B, and so on for the number of sensors 42 being used. That is, the controller 44 may be in communication with each of the sensors 42, and thus, may be in communication with the first, second, third, and/or fourth sensors 42A, 42B, 42C, 42D, etc. The controller 44 may use the information about the temperature of the exterior 14 to determine where to redistribute heat across the exterior 14 of the flight vehicle 10, and thus, achieve the more homogeneous skin temperature of the exterior 14.

In certain configurations, the system 12 may include a plurality of valves 46 coupled to the fluid loop 32. The valves 46 may direct the heated working fluid 33 to selected locations of the exterior 14, e.g., the exterior panels 16, of the flight vehicle 10. Therefore, for example, one or more of the valves 46 may be opened or closed to direct the heated working fluid 33 to the desired locations across the exterior panels 16. Generally, the controller 44 is in communication with the valves 46 such that the controller 44 is configured to control the opening and closing of the valves 46 to direct the heated working fluid 33 to one or more of the second exterior panel 16B, the third exterior panel 16C, and the fourth exterior panel 16D based on the information from one or more of the first temperature sensor 42A, the second temperature sensor 42B, the third temperature sensor 42C, and the fourth temperature sensor 42D. In the above example, it is assumed that the first exterior panel 16A is the panel that heat is being taken from and redistributed to the second exterior panel 16B, the third exterior panel 16C, and/or the fourth exterior panel 16D, and so on. It is to be appreciated that more than one exterior panel 16 may be the panels 16, 24, 28 that heat is being taken from and redistributed to other ones of the exterior panels 16.

The valves 46 may be any suitable configuration, and non-limiting examples of the valves 46 may include passive valves 46, active valves 46, shape-memory alloy (SMA) valves 46, etc.

Turning back to the controller 44, instructions may be stored in a memory M of the controller 44 and automatically executed via a processor P of the controller 44 to provide the respective control functionality. Therefore, the controller 44 is configured to execute the instructions from the memory M, via the processor P. For example, the controller 44 may be a host machine or distributed system, e.g., a computer such as a digital computer or microcomputer, and, as the memory M, tangible, non-transitory computer-readable memory such as read-only memory (ROM) or flash memory. The controller 44 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 44 may include all software, firmware, hardware, memory M, algorithms, connections, sensors, etc., necessary to control, monitor, make decisions, for example, the valves 46, the sensors 42, and other components coupled to the fluid loop 32 as discussed below. It is to be appreciated that the controller 44 may also include any device capable of analyzing data from various sensors, comparing data, making the necessary decisions required to control and/or monitor the valves 46, the sensors 42, and the other components coupled to the fluid loop 32 as discussed below. Optionally, more than one controller 44 may be utilized.

For example, the hardware for the controller 44 may include one or more processors P coupled with a current driver. The one or more processors P may include any electronic circuits and/or optical circuits that are able to perform the functions described herein. For example, the processor(s) P may perform any functionality described herein for controller 44. The processor(s) P may include one or more Central Processing Units (CPU), microprocessors, Digital Signal Processors (DSPs), Application-specific Integrated Circuits (ASICs), Programmable Logic Devices (PLD), control circuitry, etc. Some non-limiting examples of processors P may include INTEL® CORE™ processors, Advanced Reduced Instruction Set Computing (RISC) Machines (ARM®) processors, etc.

Heat from the exterior 14 of the flight vehicle 10 may be redistributed in many different ways, and some examples are discussed below. FIGS. 3-6 illustrate non-limiting examples of redistributing heat across the exterior 14 of the flight vehicle 10, each of which are discussed below.

Figure 3:
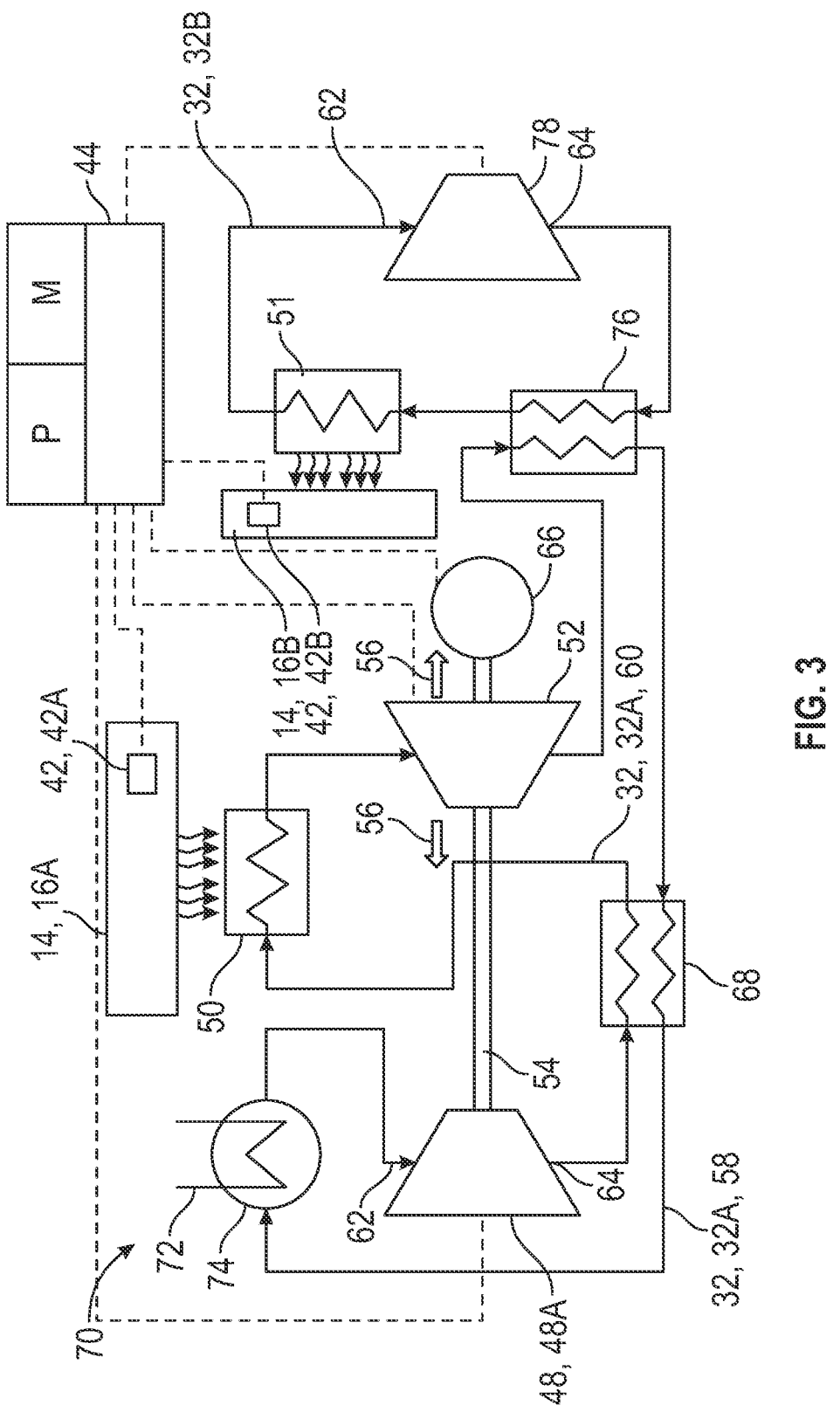
FIG. 3 is a schematic illustration of a first configuration of the system.
Figure 4:
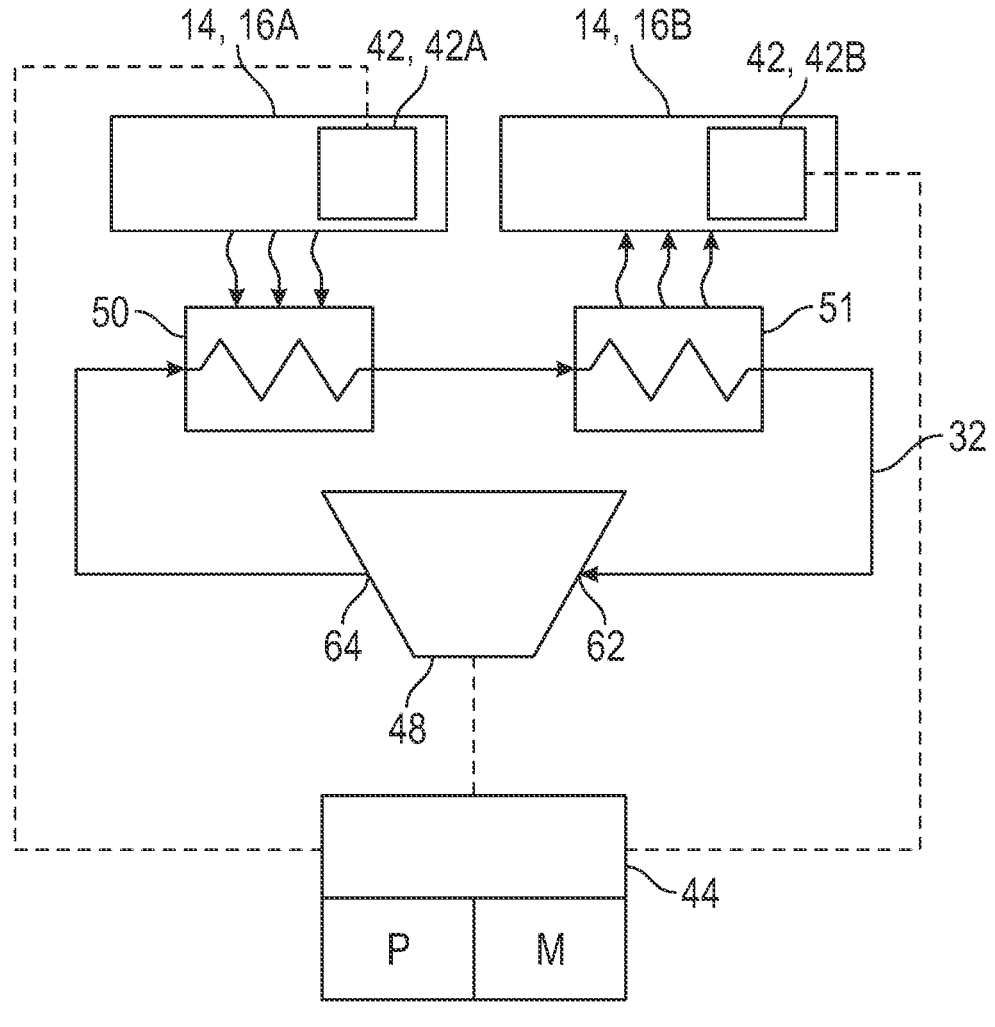
FIG. 4 is a schematic illustration of a second configuration of the system.
Figure 5:
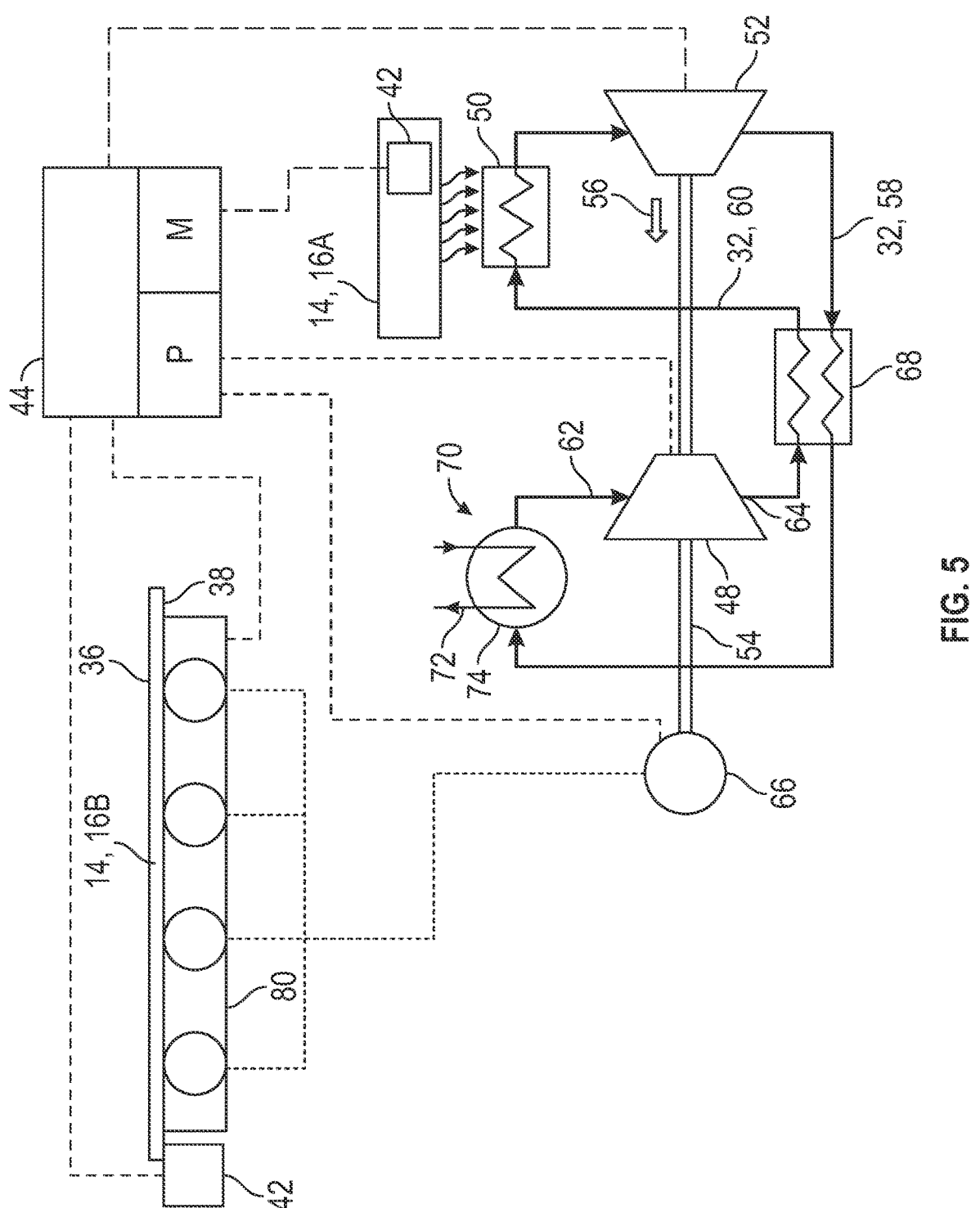
FIG. 5 is a schematic illustration of a third configuration of the system.

Turning to FIGS. 3-5, the system 12 may include a compressor 48 configured to compress the working fluid 33. Generally, the compressor 48 compresses the working fluid 33 to an increased pressure. Therefore, depending on the type of working fluid 33, the compressor 48 compresses the working fluid 33 to a pressure above the critical point. The compressor 48 is disposed along the fluid loop 32 in the flight vehicle 10, and may be in different locations depending on the configuration.

The controller 44 receives feedback from one or more of the sensors 42 and the controller 44 is programmed to start the compressor 48 when the exterior 14 of the flight vehicle 10 exceeds a threshold temperature. Non-limiting example threshold temperatures to activate the compressor 48 may include about 500 degrees C. to about 1000 degrees C. In other examples, the controller 44 uses information about the flight speed of the flight vehicle 10 to determine whether to start the compressor 48, which is indicative of the temperature of the exterior 14 of the flight vehicle 10. The controller 44 activates the compressor 48 when the flight vehicle 10 reaches a threshold flight speed. Non-limiting example threshold flight speeds to activate the compressor 48 may include Mach 3, Mach 3.5, Mach 4, and hypersonic speed.

Referring to the configurations of FIGS. 3 and 5, the system 12 may include a heat intake 50 configured to absorb heat from the first exterior panel 16A and transfer the heat to the fluid loop 32 to heat the working fluid 33. Generally, the heat intake 50 may be a section of the fluid loop 32 that is thermally coupled to the exterior 14, such as the exterior panels 16. In addition, the system 12 may include a heat outtake 51 configured to transfer heat from the fluid loop 32 to the second exterior panel 16B.

Continuing with FIGS. 3 and 5, the system 12 may also include a thermal engine 52 disposed downstream from the heat intake 50. The thermal engine 52 is coupled to the compressor 48 and configured to operate the compressor 48. For example, the thermal engine 52 and the compressor 48 may be coupled to each other mechanically or electrically. In one example, the thermal engine 52 includes a shaft 54 coupled to the compressor 48. As such, a work output 56 from the thermal engine 52 is transferred to the compressor 48 through the shaft 54, or the work output 56 is transferred to the compressor 48 via an electrical connection, and regardless of the way the work output 56 is coupled to the compressor 48, the work out causes the compressor 48 to operate. Therefore, for example, the thermal engine 52 may produce a torque as the work output 56 which is transferred through the shaft 54 to the compressor 48. Using a super-critical working fluid 33 allows the compressor 48, thermal engine 52, and other components along the fluid loop 32 to be smaller and lighter.

Generally, the compressor 48 and the thermal engine 52 divide the fluid loop 32 into a low-pressure leg 58 and a high-pressure leg 60, with the low-pressure leg 58 being downstream of the thermal engine 52 to an inlet side 62 of the compressor 48, and the high-pressure leg 60 being upstream of the thermal engine 52 to an outlet side 64 of the compressor 48. Therefore, the thermal engine 52 may operate to extract the work output 56 from the working fluid 33 by expanding the working fluid 33 to a decreased pressure.

Generally, the thermal engine 52 is disposed along the fluid loop 32 in the flight vehicle 10 and disposed downstream of the heat intake 50. The thermal engine 52 may be any suitable configuration to transfer torque and/or extract the work output 56 from the pressurized working fluid 33, and non-limiting examples may include a turbine, a scroll expander, a thermoelectric converter, a thermoionic converter, or any other suitable thermal engine 52.

Continuing with the configuration of FIG. 3, the system 12 may include a generator 66 coupled to the thermal engine 52. The generator 66 is configured to receive at least a portion of the work output 56 from the thermal engine 52 to generate electrical power. The electrical power may be used to operate an auxiliary load, engine generators 66, or any other type of load.

Again, continuing with the configuration of FIG. 3, the system 12 may optionally include a recuperator 68 disposed along the fluid loop 32, and coupled to the low-pressure leg 58 downstream of the turbine and coupled to the high-pressure leg 60 downstream to the output side of the compressor 48. The recuperator 68 is configured to transfer heat from the low-pressure leg 58 of the fluid loop 32 to the high-pressure leg 60 of the fluid loop 32. Generally, the recuperator 68 may improve thermal efficiency of the system 12. Therefore, the recuperator 68 may operate as a heat exchanger. Transferring heat to the working fluid 33 via the recuperator 68 prior to further heating the working fluid 33 via the heat intake 50 increases the temperature of the working fluid 33 that enters the thermal engine 52, which increase an amount of the work output 56 that may be extracted from the working fluid 33.

Continuing with the configuration of FIG. 3, the system 12 may include a precooler 70 disposed along the fluid loop 32, and coupled to the low-pressure leg 58 upstream of the compressor 48 and downstream of the recuperator 68. The precooler 70 is configured for removing excess heat from the working fluid 33. Therefore, for example, the precooler 70 may ensure that the temperature of the working fluid 33 does not exceed an operating temperature range for the compressor 48. The excess heat from the precooler 70 may be expelled or rejected to the surrounding atmosphere or transferred to a secondary fluid, in a heat sink loop 72, for another system of the flight vehicle 10. In certain configuration, the precooler 70 may include a precooler heat exchanger 74. As such, the heat sink loop 72 transfers the excess heat from the precooler 70 to a storage structure containing the secondary fluid or to a thermal energy storage device. The secondary fluid of the heat sink loop 72 may be any suitable fluid, and non-limiting examples may include fuel such as hydrocarbon fuel (e.g., Jet-A, JP-8, JP-10, kerosene, RP2, etc.), cryogenic fuel (e.g., liquid hydrogen, liquid natural gas, etc.), etc.; water, or other types of fluid disposed in the flight vehicle 10.

Again, referring to FIG. 3, the fluid loop 32 forms a first loop 32A and a second loop 32B isolated from each other. The first loop 32A and the second loop 32B each contain the working fluid 33. The working fluid 33 of the first loop 32A and the second loop 32B may be any of the substances described above. In certain configurations, the working fluid 33 of the first loop 32A is different from the working fluid 33 of the second loop 32B. For example, the first loop 32A may contain the working fluid 33 being a first substance and the second loop 32B may contain the working fluid 33 being a second substance different from the first substance. As another example, in certain configurations, the working fluid 33 of the first loop 32A is in the supercritical state, and the working fluid 33 of the second loop 32B is not in the supercritical state. In other configurations, the working fluid 33 is the same type of working fluid in both of the first loop 32A and the second loop 32B. Therefore, for example, the working fluid 33 may be in the supercritical state in both of the first loop 32A and the second loop 32B. In the configuration of FIG. 3, the first loop 32A may be referred to as a high-pressure loop, and the second loop 32B may be referred to as a low-pressure loop.

The system 12 may also include a heat exchanger 76 (see FIG. 3) coupled to the first loop 32A and the second loop 32B. Generally, the heat exchanger 76 is disposed downstream of the turbine and upstream of the recuperator 68. Heat from the working fluid 33 of the first loop 32A is transferred to the second loop 32B via the heat exchanger 76 to heat the second exterior panel 16B. That is, heat from the working fluid 33 of the first loop 32A is transferred to the working fluid 33 of the second loop 32B via the heat exchanger 76 to heat the working fluid 33 of the second loop 32B. The second loop 32B then transfers the heated working fluid 33 to the desired exterior panel 16 to heat or increase the temperature of that exterior panel 16.

In certain configurations, more than one compressor 48 may be used. Therefore, for example, again referring to FIG. 3, the compressor 48 is further defined as a first compressor 48A, and the first compressor 48A is coupled to the first loop 32A. In this configuration, the system 12 may further include a second compressor 78 coupled to the second loop 32B, and the second compressor 78 is configured to compress the working fluid 33 of the second loop 32B. Generally, the second compressor 78 compresses the working fluid 33 of the second loop 32B to an increased pressure. Therefore, depending on the type of working fluid 33, the second compressor 78 compresses the working fluid 33 of the second loop 32B, and if the working fluid 33 is a supercritical working fluid, the working fluid 33 of the second loop 32B is compressed to a pressure above the critical point. The critical point is discussed above and will not be repeated.

Continuing with FIG. 3, various exterior panels 16, such as the first exterior panel 16A, as well as the heat intake 50, the thermal engine 52, and the first compressor 48A are coupled to the first loop 32A. The second loop 32B is coupled to various exterior panels 16, such as the second exterior panel 16B, as well as the second compressor 78. The second compressor 78 is disposed along the second fluid loop 32 between the heat exchanger 76 and the exterior panel 16 to be heated.

Turning to the configuration of FIG. 4, the fluid loop 32 is a closed loop between various exterior panels 16. In this configuration, heat from the exterior 14 is transferred to the working fluid 33 which causes that exterior panel 16 to decrease the temperature of that exterior panel 16, and the heated working fluid 33 is then transferred to another one of the exterior panels 16 via the compressor 48, which causes the other exterior panel 16 to increase the temperature of that other exterior panel 16. As such, heat from the first exterior panel 16A may be transferred to the working fluid 33 via the heat intake 50, and the heated working fluid 33 may be transferred to the second exterior panel 16B via the heat outtake 51. Therefore, for example, the closed loop may be disposed between the first exterior panel 16A, the second exterior panel 16B, and the compressor 48 such that the heated working fluid 33 is circulated directly from the first exterior panel 16A to the second exterior panel 16B to heat the second exterior panel 16B to the second altered temperature greater than the second initial temperature.

Turning to the configuration of FIG. 5, the system 12 may include the heat intake 50, the thermal engine 52, the compressor 48, the recuperator 68, the generator 66, and the precooler 70 as discussed above for the configuration of FIG. 3, some of which will be repeated for FIG. 5, but see above for a detailed discussion of these features.

For FIG. 5, the thermal engine 52 is disposed downstream to the heat intake 50, and the thermal engine 52 is operable to produce the work output 56 as discussed above. Therefore, the compressor 48 and the generator 66 may be coupled to the thermal engine 52 such that the compressor 48 and the generator 66 may use some of the work output 56. The recuperator 68 is disposed along the fluid loop 32, and coupled to the low-pressure leg 58 downstream of the turbine and coupled to the high-pressure leg 60 downstream to the output side of the compressor 48. The precooler heat exchanger 74 of the precooler 70 is coupled to the low-pressure leg 58 upstream of the compressor 48 and downstream of the recuperator 68.

Continuing with FIG. 5, the system 12 may include a heater 80 coupled to one or more exterior panels 16. The heater 80 may be incorporated inside of one or more of the exterior panels 16 or disposed adjacent to the inner surface 38 of the one or more of the exterior panels 16. For example, the heater 80 may be coupled to the second exterior panel 16B, as this may be the exterior panel 16 to be warmed up to a higher temperature. The heater 80 and the generator 66 are electrically connected to each other such that power from the generator 66 may operate the heater 80. The generator 66 is operably coupled to the thermal engine 52 such that the work output 56 from the thermal engine 52 is used via the generator 66 to provide the power to the heater 80 which allows the heater 80 to warm the second exterior panel 16B. That is, the temperature of the first exterior panel 16A may be reduced via heat being transferred to the working fluid 33, and then the heated working fluid 33 from the first exterior panel 16A is transferred to the thermal engine 52 that uses that heat to produce the work output 56 used via the generator 66 which ultimately increases the temperature of the second exterior panel 16B. The heater 80 may be any suitable configuration, and non-limiting examples of the heater 80 may include heating elements, such as blankets, plates, coils, tape, cartridges, resistive heating, cylinders, cord, etc. It is to be appreciated that the generator 66 may be used to charge batteries, and the batteries may be used to power the heater 80 or assist the generator 66 in powering the heater 80. In other configurations, the generator 66 may be replaced with a thermo-electric device that is used to power the heater 80.

Continuing with FIG. 5, the controller 44 may be in communication with the generator 66 and the heater 80. The controller 44 may use various information, including the information from the sensors 42, to determine when to operate the heater 80.

Figure 6:
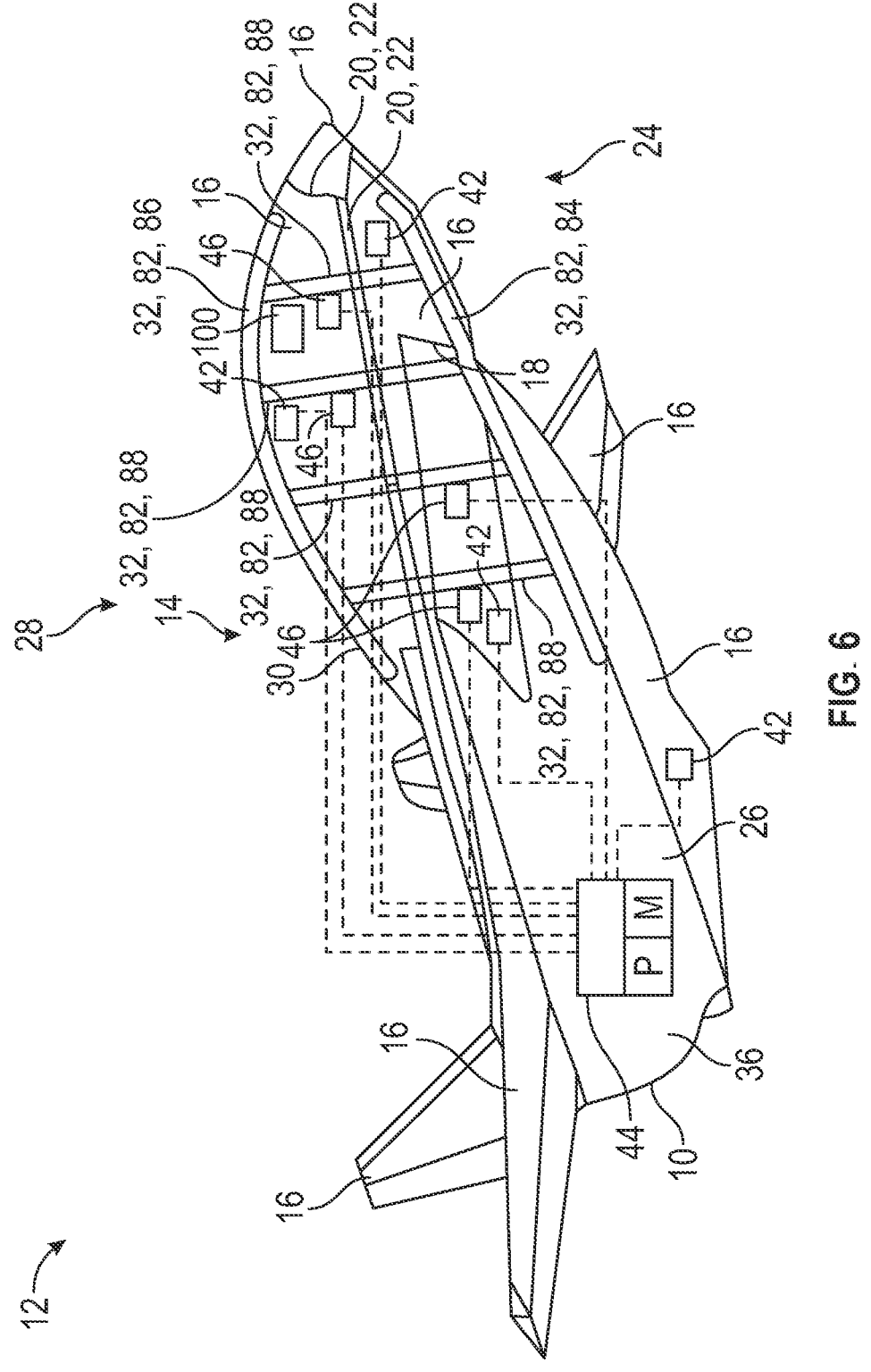
FIG. 6 is a schematic illustration of a fourth configuration of the system.

Turning to the configuration of FIG. 6, the fluid loop 32 is configured as a heat pipe 82 having an evaporator side 84 disposed along the windward skin panel 24 and a condenser side 86 disposed along the leeward skin panel 28. The evaporator side 84 and the condenser side 86 are connected to each other via a plurality of intermediate pipe connections 88. The evaporator side 84 is configured to heat the working fluid 33 to transfer heat away from the windward skin panel 24, and the heated working fluid 33 is transferred through the intermediate pipe connections 88 to the condenser side 86 to transfer heat to the leeward skin panel 28.

In certain configurations, the heat pipe 82 is a thermal diode configuration in which the evaporator side 84 enhances thermal transport toward the condenser side 86, and the condenser side 86 inhibits thermal transport back towards the evaporator side 84. More specifically, the intermediate pipe connections 88 transfers the working fluid 33 between each side 84, 86, and may contain components or features to cause the thermal transfer to the sides 84, 86. Therefore, the windward skin panel 24 cools down while the leeward skin panel 28 warms up to reduce the temperature differential between different locations of the exterior 14 of the flight vehicle 10. That is, the temperature of the windward skin panel 24 is reduced and the temperature of the leeward skin panel 28 is increased, which reduces the temperature differential between the locations. It is to be appreciated that the valves 46 may be disposed in any suitable location, and non-limiting examples may include along the fluid loop 32 of the evaporator side 84, the fluid loop 32 of the condenser side 86, and/or the intermediate pipe connections 88.

Generally, the heat pipe 82 provides a passive way to spread and transfer the working fluid 33 to various locations along the exterior 14 of the aircraft. Various passive ways may be used to spread and transfer the working fluid 33, and non-limiting examples may include gravity-driven, such as a thermosyphon, etc.; surface tension driven, such as heat pipe or vapor chamber, etc. The heat pipe 82 may include the tubes 40 integrated or integral with the exterior panels 16, or the tubes 40 attached to the inner surface 38 of the exterior panel 16. The heat pipe 82 may be any suitable configuration, and non-limiting examples may include an oscillating/pulsating heat pipe, a variable conductance heat pipe, etc.

The present disclosure also provides the method 100 for reducing the temperature differential across the exterior 14 of the flight vehicle 10. It is to be appreciated that the order or sequence of performing the method 100 as discussed below is for illustrative purposes and other orders or sequences are within the scope of the present teachings. It is to also be appreciated that the method 100 may include other features not specifically discussed immediately below.

During flight of the flight vehicle 10, the exterior 14 may heat up due to aerodynamics. Once the flight vehicle 10 reaches a certain flight speed, it may be desirable to reduce temperature differentials across the exterior 14 of the flight vehicle 10. For example, it may be desirable to reduce temperature differentials across the exterior 14 of the flight vehicle 10 when the flight speed reaches at least Mach 3 or higher, per the method 100 described herein.

Therefore, the method 100 includes advancing the flight vehicle 10 at the flight speed of at least Mach 3, and the exterior 14 of the flight vehicle 10 is aerodynamically heated via advancing the flight vehicle 10 at the flight speed. That is, the exterior 14 of the flight vehicle 10 is aerodynamically heated via advancing the flight vehicle 10 at the flight speed of at least Mach 3.

As discussed above, the exterior 14 may include the first exterior panel 16A being at the first initial temperature and the second exterior panel 16B being at the second initial temperature. Also, as discussed above, the first initial temperature is greater than the second initial temperature, and the temperature difference between the first initial temperature and the second initial temperature define the initial temperature differential.

The working fluid 33 is circulated through the fluid loop 32, and the working fluid 33 is used to transfer heat as discussed herein. The fluid loop 32 is coupled to the desired exterior panels 16, and for example, may be coupled to the first exterior panel 16A and the second exterior panel 16B. Heat from the first exterior panel 16A is transferred to the working fluid 33 which decreases the first initial temperature of the first exterior panel 16A to the first altered temperature and heats the working fluid 33. The heated working fluid 33 is circulated from the first exterior panel 16A, and the heated working fluid 33 is used to heat the second exterior panel 16B to the second altered temperature greater than the second initial temperature. The temperature difference between the first altered temperature and the second altered temperature defines the secondary temperature differential less than the initial temperature differential. By reducing the temperature differentials between the different locations of the exterior 14, different types of materials may be used for various components of the flight vehicle 10. Also, by reducing the temperature differentials between the different locations of the exterior 14, the integrity along the mold lines 22 may be improved, which reduces thermal stress and thermal distortion of the airframe. Furthermore, by reducing the temperature differentials between the different locations of the exterior 14, the flight vehicle 10 may be composed of materials having lower temperature characteristics.

Turning to the configuration of FIG. 3, the fluid loop 32 forms the first loop 32A and the second loop 32B isolated from each other. The first loop 32A and the second loop 32B each contain the working fluid 33. The working fluid 33 of the first loop 32A is compressed via the first compressor 48A. The thermal engine 52 is operably coupled to the first compressor 48A to operate the first compressor 48A. Heat is absorbed from the first exterior panel 16A via the heat intake 50 and the heat is transferred to the first loop 32A to heat the working fluid 33. That is, the working fluid 33 absorbs heat from the first exterior panel 16A via the heat intake 50. The first exterior panel 16A, the heat intake 50, the thermal engine 52, and the first compressor 48A are coupled to the first loop 32A. The working fluid 33 of the second loop 32B is compressed via the second compressor 78. Heat is transferred from the working fluid 33 of the first loop 32A to the working fluid 33 of the second loop 32B via the heat exchanger 76 to heat the second exterior panel 16B. More specifically, the heated working fluid 33 of the first loop 32A transfers heat to the working fluid 33 of the second loop 32B via the heat exchanger 76. As mentioned above, the controller 44 may be in communication with various components of the configuration of FIG. 3, such as the optional sensors 42, the optional valves 46, the generator 66, the first compressor 48A, the second compressor 78, etc.

Turning to the configuration of FIG. 4, the fluid loop 32 is the closed loop between the first exterior panel 16A, the second exterior panel 16B, and the compressor 48. In this configuration, circulating the heated working fluid 33 may further include circulating the heated working fluid 33 directly from the first exterior panel 16A to the second exterior panel 16B to heat the second exterior panel 16B to the second altered temperature greater than the second initial temperature. As mentioned above, the controller 44 may be in communication with various components of the configuration of FIG. 4, such as the optional sensors 42, the optional valves 46, the compressor 48, etc.

Referring to the configuration of FIG. 5, the working fluid 33 is compressed via the compressor 48. Heat is absorbed from the first exterior panel 16A via the heat intake 50, and the heat is transferred to the fluid loop 32 to heat the working fluid 33. The thermal engine 52 is operably coupled to the generator 66 such that the work output 56 from the thermal engine 52 is used via the generator 66 to provide power. Furthermore, the thermal engine 52 is coupled to the compressor 48 to operate the compressor 48. The compressor 48 compresses the working fluid 33 to increase the pressure of the working fluid 33. Power from the generator 66 may be used via the heater 80 to operate the heater 80. The heater 80, coupled to the second exterior panel 16B, is operated via power from the generator 66 to warm the second exterior panel 16B. That is, operation of the heater 80 may increase the temperature of the second exterior panel 16B. As mentioned above, the controller 44 may be in communication with various components of the configuration of FIG. 5, such as the optional sensors 42, the optional valves 46, the generator 66, the compressor 48, the heather, etc.

Turning to the configuration of FIG. 6, as mentioned above, the first exterior panel 16A may include the windward skin panel 24 disposed along the bottom face 26 of the flight vehicle 10 and the second exterior panel 16B may include the leeward skin panel 28 disposed along the top face 30 of the flight vehicle 10. The fluid loop 32 is configured as the heat pipe 82 that may include the evaporator side 84 disposed along the windward skin panel 24 and the condenser side 86 disposed along the leeward skin panel 28. The evaporator side 84 and the condenser side 86 are connected to each other via the pipe connections. In this configuration, circulating the heated working fluid 33 may further include passively circulating the heated working fluid 33 from the evaporator side 84 away from the windward skin panel 24 through the intermediate pipe connections 88 to the condenser side 86 to transfer heat to the leeward skin panel 28. As mentioned above, the controller 44 may be in communication with various components of the configuration of FIG. 6, such as the optional sensors 42, the optional valves 46, etc.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

The following Clauses provide some example configurations of the system 12, the flight vehicle 10, and the method 100 as disclosed herein.

Clause 1: A system for reducing a temperature differential across a flight vehicle traveling at a flight speed of at least Mach 3, the system comprising: an exterior of the flight vehicle includes a first exterior panel being at a first initial temperature and a second exterior panel being at a second initial temperature, wherein the first initial temperature is greater than the second initial temperature, and a temperature difference between the first initial temperature and the second initial temperature define an initial temperature differential; a fluid loop configured to contain a working fluid; wherein the fluid loop is coupled to the first exterior panel and the second exterior panel such that heat is transferred from the first exterior panel to the working fluid to decrease the first initial temperature of the first exterior panel to a first altered temperature, and to heat the working fluid; and wherein the heated working fluid is circulated from the first exterior panel and used to heat the second exterior panel to a second altered temperature greater than the second initial temperature, wherein a temperature difference between the first altered temperature and the second altered temperature defines a secondary temperature differential less than the initial temperature differential.

Clause 2: The system as set forth in clause 1 further comprising a plurality of sensors including a first sensor coupled to the first exterior panel to measure the first initial temperature and the first altered temperature, and a second sensor coupled to the second exterior panel to measure the second initial temperature and the second altered temperature.

Clause 3: The system as set forth in any one of the preceding clauses further comprising a controller in communication with the first sensor and the second sensor to receive information about the first initial temperature and the first altered temperature of the first exterior panel and the second initial temperature and the second altered temperature of the second exterior panel.

Clause 4: The system as set forth in any one of the preceding clauses: wherein the exterior includes a third exterior panel and a fourth exterior panel, and the fluid loop is coupled to the third exterior panel and the fourth exterior panel; wherein the sensors further include a third sensor coupled to the third exterior panel and a fourth sensor coupled to the fourth exterior panel; and further comprising a plurality of valves coupled to the fluid loop, and the controller is in communication with the valves such that the controller is configured to control opening and closing of the valves to direct the heated working fluid to one or more of the second exterior panel, the third exterior panel, and the fourth exterior panel based on the information from one or more of the first sensor, the second sensor, the third sensor, and the fourth sensor.

Clause 5: The system as set forth in any one of the preceding clauses further comprising a compressor configured to compress the working fluid.

Clause 6: The system as set forth in any one of the preceding clauses further comprising: a heat intake configured to absorb heat from the first exterior panel and transfer the heat to the fluid loop to heat the working fluid; and a thermal engine coupled to the compressor and configured to operate the compressor, and wherein the thermal engine is disposed downstream of the heat intake.

Clause 7: The system as set forth in any one of the preceding clauses: wherein the fluid loop forms a first loop and a second loop isolated from each other, and the first loop contains the working fluid being a first substance and the second loop contains the working fluid being a second substance different from the first substance; wherein first exterior panel, the heat intake, the thermal engine, and the compressor are coupled to the first loop; wherein the second loop is coupled to the second exterior panel; and further comprising a heat exchanger coupled to the first loop and the second loop, and heat from the working fluid of the first loop is transferred to the second loop via the heat exchanger to heat the second exterior panel.

Clause 8: The system as set forth in any one of the preceding clauses: wherein the compressor is further defined as a first compressor; and further comprising a second compressor coupled to the second loop, and configured to compress the working fluid.

Clause 9: The system as set forth in one of clauses 1-6 further comprising: a heater coupled to the second exterior panel; and a generator operably coupled to the thermal engine such that work output from the thermal engine is used via the generator to provide power to the heater which allows the heater to warm the second exterior panel.

Clause 10: The system as set forth in one of clauses 1-5 wherein the fluid loop is a closed loop between the first exterior panel, the second exterior panel, and the compressor such that the heated working fluid is circulated directly from the first exterior panel to the second exterior panel to heat the second exterior panel to the second altered temperature greater than the second initial temperature.

Clause 11: The system as set forth in one of clauses 1-4 wherein the first exterior panel includes a windward skin panel disposed along a bottom face of the flight vehicle and the second exterior panel includes a leeward skin panel disposed along a top face of the flight vehicle.

Clause 12: The system as set forth in one of clauses 1-4 or 11 wherein the fluid loop is integrated into the windward skin panel and the leeward skin panel.

Clause 13: The system as set forth in one of clauses 1-4, 11, or 12 wherein the exterior includes a plurality of mold lines that join the windward skin panel and the leeward skin panel, and wherein the fluid loop is integrated into the windward skin panel and the leeward skin panel adjacent to the mold lines.

Clause 14: The system as set forth in one of clauses 1-4 or 11-13 wherein: the fluid loop is configured as a heat pipe including an evaporator side disposed along the windward skin panel and a condenser side disposed along the leeward skin panel; the evaporator side and the condenser side are connected to each other via a plurality of intermediate pipe connections; and the evaporator side is configured to heat the working fluid to transfer heat away from the windward skin panel, and the heated working fluid is transferred through the intermediate pipe connections to the condenser side to transfer heat to the leeward skin panel.

Clause 15: The system as set forth in one of clauses 1-4 or 11-14 wherein the heat pipe is a thermal diode configuration in which the evaporator side enhances thermal transport toward the condenser side, and the condenser side inhibits thermal transport back towards the evaporator side.

Clause 16: A method for reducing a temperature differential across an exterior of a flight vehicle, the method comprising: advancing the flight vehicle at a flight speed of at least Mach 3, wherein the exterior of the flight vehicle is aerodynamically heated via advancing the flight vehicle at the flight speed, and wherein the exterior includes a first exterior panel being at a first initial temperature and a second exterior panel being at a second initial temperature, wherein the first initial temperature is greater than the second initial temperature, and a temperature difference between the first initial temperature and the second initial temperature define an initial temperature differential; circulating a working fluid through a fluid loop, wherein the fluid loop is coupled to the first exterior panel and the second exterior panel; transferring heat from the first exterior panel to the working fluid which decreases the first initial temperature of the first exterior panel to a first altered temperature and heats the working fluid; and circulating the heated working fluid from the first exterior panel and using the heated working fluid to heat the second exterior panel to a second altered temperature greater than the second initial temperature, wherein a temperature difference between the first altered temperature and the second altered temperature defines a secondary temperature differential less than the initial temperature differential.

Clause 17: The method as set forth in clause 16: wherein the fluid loop forms a first loop and a second loop isolated from each other, and the first loop and the second loop each contain the working fluid; further comprising compressing the working fluid of the first loop via a first compressor; further comprising operably coupling a thermal engine to the first compressor to operate the first compressor; further comprising absorbing heat from the first exterior panel via a heat intake and transferring the heat to the first loop to heat the working fluid, wherein the first exterior panel, the heat intake, the thermal engine, and the first compressor are coupled to the first loop; further comprising compressing the working fluid of the second loop via a second compressor; and further comprising transferring heat from the working fluid of the first loop to the working fluid of the second loop via a heat exchanger to heat the second exterior panel.

Clause 18: The method as set forth in clause 16 wherein the fluid loop is a closed loop between the first exterior panel, the second exterior panel, and the compressor; wherein circulating the heated working fluid further comprises circulating the heated working fluid directly from the first exterior panel to the second exterior panel to heat the second exterior panel to the second altered temperature greater than the second initial temperature.

Clause 19: The method as set forth in clause 16 further comprising: compressing the working fluid via a compressor; absorbing heat from the first exterior panel via a heat intake and transfer the heat to the fluid loop to heat the working fluid; operably coupling a thermal engine to a generator such that work output from the thermal engine is used via the generator to provide power, and wherein the thermal engine is coupled to the compressor to operate the compressor; and operating a heater, coupled to the second exterior panel, via power from the generator to warm the second exterior panel.

Clause 20: The method as set forth in clause 16 wherein: the first exterior panel includes a windward skin panel disposed along a bottom face of the flight vehicle and the second exterior panel includes a leeward skin panel disposed along a top face of the flight vehicle; the fluid loop is configured as a heat pipe including an evaporator side disposed along the windward skin panel and a condenser side disposed along the leeward skin panel; the evaporator side and the condenser side are connected to each other via a plurality of intermediate pipe connections; and circulating the heated working fluid further comprises passively circulating the heated working fluid from the evaporator side away from the windward skin panel through the intermediate pipe connections to the condenser side to transfer heat to the leeward skin panel.

What is claimed is:

1. A system for reducing a temperature differential across a flight vehicle traveling at a flight speed of at least Mach 3, the system comprising:

an exterior of the flight vehicle including a first exterior panel being at a first initial temperature and a second exterior panel being at a second initial temperature, wherein the first initial temperature is greater than the second initial temperature, and a temperature difference between the first initial temperature and the second initial temperature define an initial temperature differential;

a fluid loop configured to contain a working fluid;

wherein the fluid loop is coupled to the first exterior panel and the second exterior panel such that heat is transferred from the first exterior panel to the working fluid to decrease the first initial temperature of the first exterior panel to a first altered temperature, and to heat the working fluid; and wherein the heated working fluid is circulated from the first exterior panel and used to heat the second exterior panel to a second altered temperature greater than the second initial temperature, wherein a temperature difference between the first altered temperature and the second altered temperature defines a secondary temperature differential less than the initial temperature differential.

2. The system as set forth in claim 1 further comprising a plurality of sensors including a first sensor coupled to the first exterior panel to measure the first initial temperature and the first altered temperature, and a second sensor coupled to the second exterior panel to measure the second initial temperature and the second altered temperature.

3. The system as set forth in claim 2 further comprising a controller in communication with the first sensor and the second sensor to receive information about the first initial temperature and the first altered temperature of the first exterior panel and the second initial temperature and the second altered temperature of the second exterior panel.

4. The system as set forth in claim 3:

wherein the exterior includes a third exterior panel and a fourth exterior panel, and the fluid loop is coupled to the third exterior panel and the fourth exterior panel;

wherein the sensors further include a third sensor coupled to the third exterior panel and a fourth sensor coupled to the fourth exterior panel; and further comprising a plurality of valves coupled to the fluid loop, and the controller is in communication with the valves such that the controller is configured to control opening and closing of the valves to direct the heated working fluid to one or more of the second exterior panel, the third exterior panel, and the fourth exterior panel based on the information from one or more of the first sensor, the second sensor, the third sensor, and the fourth sensor.

5. The system as set forth in claim 1, wherein the working fluid is gaseous, and wherein the system further comprises a compressor configured to compress the working fluid.

6. The system as set forth in claim 5 further comprising:

a heat intake configured to absorb heat from the first exterior panel and transfer the heat to the fluid loop to heat the working fluid; and a thermal engine coupled to the compressor and configured to operate the compressor, and wherein the thermal engine is disposed downstream of the heat intake.

7. The system as set forth in claim 6:

wherein the fluid loop forms a first loop and a second loop isolated from each other, and the first loop contains the working fluid being a first substance and the second loop contains the working fluid being a second substance different from the first substance;

wherein the first exterior panel, the heat intake, the thermal engine, and the compressor are coupled to the first loop;

wherein the second loop is coupled to the second exterior panel; and further comprising a heat exchanger coupled to the first loop and the second loop, and heat from the working fluid of the first loop is transferred to the second loop via the heat exchanger to heat the second exterior panel.

8. The system as set forth in claim 7:

wherein the compressor is further defined as a first compressor; and further comprising a second compressor coupled to the second loop, and configured to compress the working fluid.

9. The system as set forth in claim 6 further comprising:

a heater coupled to the second exterior panel; and a generator operably coupled to the thermal engine such that work output from the thermal engine is used via the generator to provide power to the heater which allows the heater to warm the second exterior panel.

10. The system as set forth in claim 5 wherein the fluid loop is a closed loop between the first exterior panel, the second exterior panel, and the compressor such that the heated working fluid is circulated directly from the first exterior panel to the second exterior panel to heat the second exterior panel to the second altered temperature greater than the second initial temperature.

11. The system as set forth in claim 1 wherein the first exterior panel includes a windward skin panel disposed along a bottom face of the flight vehicle and the second exterior panel includes a leeward skin panel disposed along a top face of the flight vehicle.

12. The system as set forth in claim 11 wherein the fluid loop is integrated into the windward skin panel and the leeward skin panel.

13. The system as set forth in claim 12 wherein the exterior includes a plurality of mold lines that join the windward skin panel and the leeward skin panel, and wherein the fluid loop is integrated into the windward skin panel and the leeward skin panel adjacent to the mold lines.

14. The system as set forth in claim 11 wherein:

the fluid loop is configured as a heat pipe including an evaporator side disposed along the windward skin panel and a condenser side disposed along the leeward skin panel;

the evaporator side and the condenser side are connected to each other via a plurality of intermediate pipe connections; and the evaporator side is configured to heat the working fluid to transfer heat away from the windward skin panel, and the heated working fluid is transferred through the intermediate pipe connections to the condenser side to transfer heat to the leeward skin panel.

15. The system as set forth in claim 14 wherein the heat pipe is a thermal diode configuration in which the evaporator side enhances thermal transport toward the condenser side, and the condenser side inhibits thermal transport back towards the evaporator side.

16. A method for reducing a temperature differential across an exterior of a flight vehicle, the method comprising:

advancing the flight vehicle at a flight speed of at least Mach 3, wherein the exterior of the flight vehicle is aerodynamically heated via advancing the flight vehicle at the flight speed, and wherein the exterior includes a first exterior panel being at a first initial temperature and a second exterior panel being at a second initial temperature, wherein the first initial temperature is greater than the second initial temperature, and a temperature difference between the first initial temperature and the second initial temperature define an initial temperature differential;

circulating a working fluid through a fluid loop, wherein the fluid loop is coupled to the first exterior panel and the second exterior panel;

transferring heat from the first exterior panel to the working fluid which decreases the first initial temperature of the first exterior panel to a first altered temperature and heats the working fluid; and circulating the heated working fluid from the first exterior panel and using the heated working fluid to heat the second exterior panel to a second altered temperature greater than the second initial temperature, wherein a temperature difference between the first altered temperature and the second altered temperature defines a secondary temperature differential less than the initial temperature differential.

17. The method as set forth in claim 16:

wherein the fluid loop forms a first loop and a second loop isolated from each other, and the first loop and the second loop each contain the working fluid;

wherein the working fluid is gaseous, and wherein the method further comprises compressing the working fluid of the first loop via a first compressor;

further comprising operably coupling a thermal engine to the first compressor to operate the first compressor;

further comprising absorbing heat from the first exterior panel via a heat intake and transferring the heat to the first loop to heat the working fluid, wherein the first exterior panel, the heat intake, the thermal engine, and the first compressor are coupled to the first loop;

further comprising compressing the working fluid of the second loop via a second compressor; and further comprising transferring heat from the working fluid of the first loop to the working fluid of the second loop via a heat exchanger to heat the second exterior panel.

18. The method as set forth in claim 16, wherein the working fluid is gaseous, wherein the fluid loop is a closed loop between the first exterior panel, the second exterior panel, and a compressor; wherein circulating the heated working fluid further comprises circulating the heated working fluid directly from the first exterior panel to the second exterior panel to heat the second exterior panel to the second altered temperature greater than the second initial temperature.

19. The method as set forth in claim 16 further comprising:

compressing the working fluid via a compressor, wherein the working fluid is gaseous;

absorbing heat from the first exterior panel via a heat intake and transfer the heat to the fluid loop to heat the working fluid;

operably coupling a thermal engine to a generator such that work output from the thermal engine is used via the generator to provide power, and wherein the thermal engine is coupled to the compressor to operate the compressor; and operating a heater, coupled to the second exterior panel, via power from the generator to warm the second exterior panel.

20. The method as set forth in claim 16 wherein:

the first exterior panel includes a windward skin panel disposed along a bottom face of the flight vehicle and the second exterior panel includes a leeward skin panel disposed along a top face of the flight vehicle;

the fluid loop is configured as a heat pipe including an evaporator side disposed along the windward skin panel and a condenser side disposed along the leeward skin panel;

the evaporator side and the condenser side are connected to each other via a plurality of intermediate pipe connections; and circulating the heated working fluid further comprises passively circulating the heated working fluid from the evaporator side away from the windward skin panel through the intermediate pipe connections to the condenser side to transfer heat to the leeward skin panel.

* * * * *